(12) United States Patent
Wieth et al.

(10) Patent No.: US 9,610,964 B2
(45) Date of Patent: Apr. 4, 2017

(54) DISPLAY ELEMENT FOR DISPLAYING INFORMATION ON A PUSH HANDLE

(71) Applicants: Franz Wieth, Puchheim (DE); Andreas Filosi, Puchheim (DE)

(72) Inventors: Franz Wieth, Puchheim (DE); Horst Sonnendorfer, Puchheim (DE)

(*) Notice: Subject to any disclaimer, the term of this patent is extended or adjusted under 35 U.S.C. 154(b) by 0 days.

(21) Appl. No.: 14/439,323

(22) PCT Filed: Oct. 28, 2013

(86) PCT No.: PCT/EP2013/072513
§ 371 (c)(1),
(2) Date: Apr. 29, 2015

(87) PCT Pub. No.: WO2014/067899
PCT Pub. Date: May 8, 2014

(65) Prior Publication Data
US 2015/0291198 A1 Oct. 15, 2015

(30) Foreign Application Priority Data
Oct. 29, 2012 (DE) .......... 10 2012 110 348

(51) Int. Cl.
G09F 23/00 (2006.01)
B62B 3/14 (2006.01)
G09F 21/04 (2006.01)
G09F 23/06 (2006.01)

(52) U.S. Cl.
CPC ........... *B62B 3/1416* (2013.01); *G09F 21/04* (2013.01); *G09F 23/06* (2013.01)

(58) Field of Classification Search
CPC .................. G09F 23/00; G09F 3/201
See application file for complete search history.

(56) References Cited

U.S. PATENT DOCUMENTS

| | | | |
|---|---|---|---|
| 5,810,372 A * | 9/1998 | Arendt | B62B 3/1408 16/422 |
| 5,848,487 A * | 12/1998 | Alvern | B67D 7/06 141/98 |
| 8,136,275 B2 * | 3/2012 | Sonnendorfer | B62B 3/1408 235/1 D |
| 2007/0234617 A1 * | 10/2007 | Jay | G09F 7/00 40/611.01 |

(Continued)

FOREIGN PATENT DOCUMENTS

| | | |
|---|---|---|
| DE | 9317500 U1 | 12/1993 |
| DE | 9419042 U1 | 1/1995 |

(Continued)

*Primary Examiner* — Gary Hoge
(74) *Attorney, Agent, or Firm* — Laurence A. Greenberg; Werner H. Stemer; Ralph E. Locher

(57) ABSTRACT

A display element for displaying information on a push handle of a shopping cart that can be pushed by hand. The display element includes a main body having a region which is covered by a transparent cover that is separably mounted on the main body. A two-dimensional information medium can be arranged between the main body and the cover. The main body is formed with a groove into which one end edge of the information medium can be inserted and the inserted end edge is retained in the groove by frictional locking.

11 Claims, 2 Drawing Sheets

(56) References Cited

U.S. PATENT DOCUMENTS

2008/0010873 A1* 1/2008 Crum .................... B62B 3/1408
                                                            40/308
2014/0137449 A1* 5/2014 English .................. G09F 13/22
                                                            40/599

FOREIGN PATENT DOCUMENTS

| DE | 29714013 U1 | 10/1997 |
|----|-------------|---------|
| DE | 29803007 U1 | 4/1998 |
| DE | 202007005978 U1 | 8/2008 |
| EP | 0212557 A1 | 3/1987 |
| EP | 0713819 A1 | 5/1996 |
| EP | 0895920 A1 | 2/1999 |

* cited by examiner

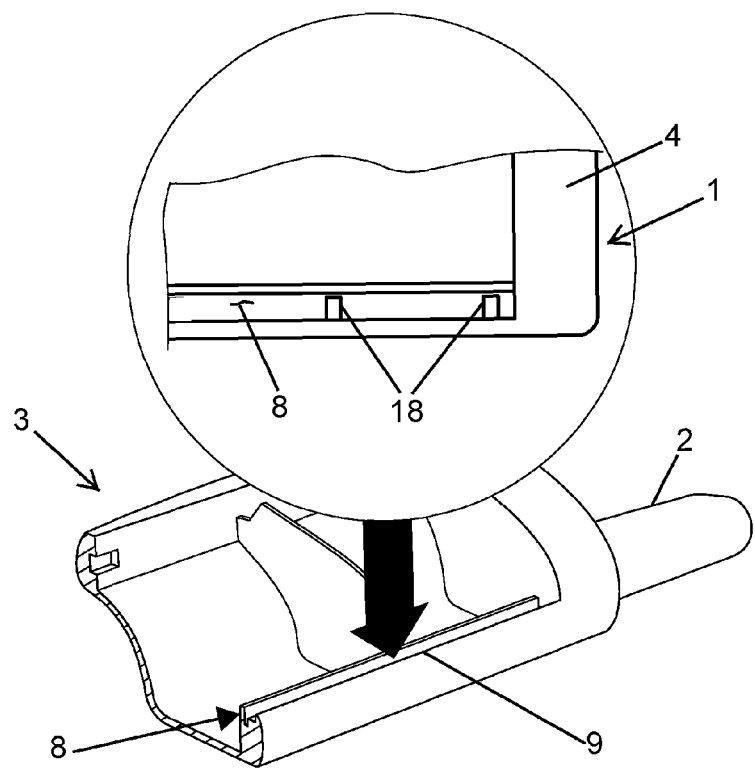
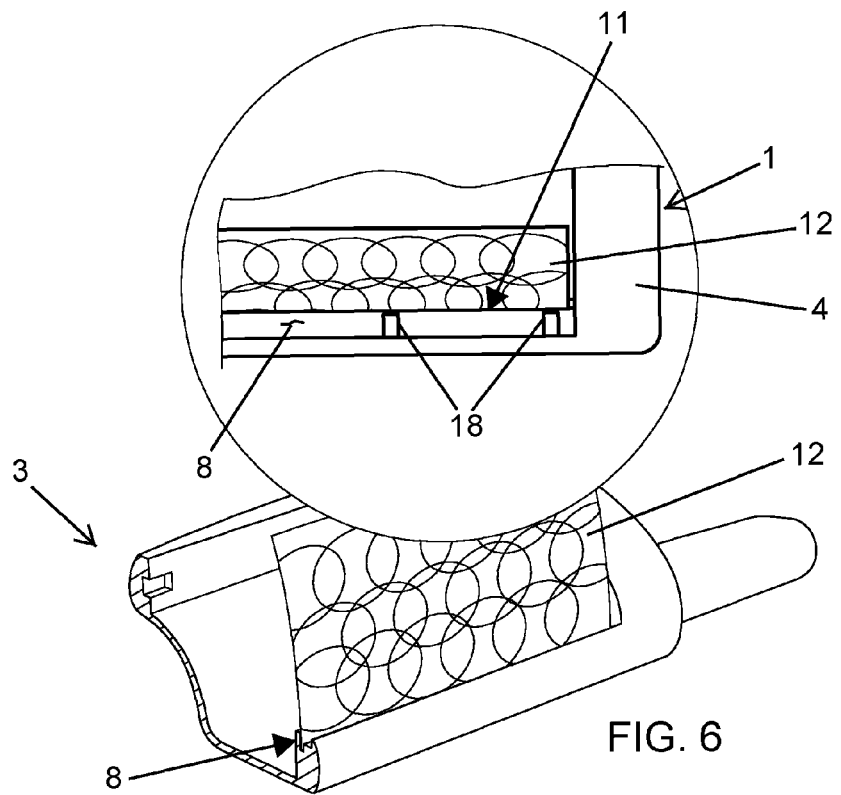

DISPLAY ELEMENT FOR DISPLAYING INFORMATION ON A PUSH HANDLE

BACKGROUND OF THE INVENTION

Field of the Invention

The invention relates to a display element for displaying information on a push handle of a manually movable shopping cart, wherein the display element comprises a main body having a region which is covered by a transparent cover separably mounted on the main body and wherein a flat-shaped information medium can be arranged between the main body and the cover. Furthermore the invention relates to a method for inserting a flat-shaped information medium into a display element, particularly into a display element according to the invention.

The push handle of a shopping cart is found in wholesale and retail businesses and is an object, with which a customer remains in constant contact while he pushes it through the shop. The push handle therefore always lies in the customer's field of vision, for example while he pushes the cart through the aisles looking for the desired products or while he looks at the goods already loaded into the cart, over and beyond the handle. Therefore, since the push handle is constantly within the customer's field of vision, it is ideally predestined to be used by a business as an information medium, respectively an advertising medium.

Ever since this idea has taken hold, push handles are increasingly equipped with display elements. Advertising media usually consisting of a piece of printed paper or carton may be inserted into them. In order to be able to provide sufficient space for the advertisement, the display elements are usually distinctly more voluminous than the handle area as such. The display element may be provided as an integral part of the handle as early as at the manufacturing stage or it may be configured as a display which can be retrofitted to the handle at a later stage.

The display elements are normally arranged centrally on the push handle enabling the customer to grip the handle firmly at the areas to the left and right thereof. Because the gripping areas are arranged outside of the display element, the shopping cart can be steered in the usual way without problems.

The area of the display element provided for the information medium is overlaid by a cover removably mounted on the display element. The cover easily prevents the information medium from being removed or from falling out and it also protects it against soiling. In order to make regular replacement of the information medium arranged below it easier, it is important that the cover can be easily detached by a member of staff. Therefore fastening of the cover usually is effected using a simply plug connection.

As the cover is in close contact with the display element, it also prevents the same from slipping. Naturally the cover should be transparent if possible so that the information presented below it is well visible.

In order to position the information in the best possible place within the customer's field of vision, the display elements are usually configured such that the advertising medium inserted into it is inclined towards the customer. The information medium, when inserted into the display element, is not placed onto a horizontal surface, but onto a slope. The sloping support surface makes positioning of the information medium difficult because once placed on it, it tends to slip. In order to prevent this a member of staff usually holds the information medium in position with one hand leaving only one hand free for closing the cover.

Sometimes the cover is used not only as protection but also as a mounting for the advertising medium. In this case the information medium is not placed onto the display element and then covered by the cover, but is first fastened to the inside of the cover and then, together with the same, placed onto the display element. Such a cover, on its inside, comprises respective receptacles for the information medium. Inserting the information medium into these receptacles is time-consuming and requires several hand movements.

Many display elements are not only inclined towards the customer, but comprise an arched support surface for the information medium. An arched support area for the information medium, be it on the display element or on the inside of the respectively arched cover, requires a bit more skill during positioning of the information medium, which as a rule is configured as a planar, non-arched rectangle.

BRIEF SUMMARY OF THE INVENTION

It is the requirement of the present invention to propose a display element of the kind described above, where inserting the information medium can be carried out in a simple and safe manner. Furthermore it is a requirement of the application to propose an easy-to-perform procedure for inserting the information medium into an above-mentioned display element.

These requirements are met by a display element as claimed, and a method as claimed. Advantageous designs are cited in the respective sub-claims.

An essential idea of the invention consists in that the main body will be provided with a groove for inserting an end edge of the information medium, wherein the inserted end edge is retained in the groove by way of a force-fit. The force-fit is created in that the information medium is clamped between the two side walls of the groove. The proposed groove in the main body permits secure positioning of the information medium on the main body. The force-fit between the groove and the information medium ensures that the information medium can no longer slip once it has been positioned in the groove. The member of staff inserting the information medium is no longer required to keep holding the inserted information medium in position. He/she now has both hands free for placing the cover onto the main body, i.e. for closing it. Nor does one of the other end edges of the information medium have to be inserted or fixed on the main body or held manually in position.

The rim of the information medium retained in the groove does not only make sure that the information medium, prior to closing the cover, is retained securely in its position, rather, during the cover closing operation, the rim remains fixed in the groove due to the force-fit. When the information medium retained in the groove makes contact with the cover during the closing operation, it is carried along by the cover. In this way the information medium is bent in direction of the main body. The particular advantage of this is that the information medium is guided, not by hand but by the cover, into its end position on its intended support surface of the main body. This working step which otherwise would have to be carried out separately by a member of staff, is therefore completed in one go together with the necessary closing of the cover. The information medium, carried along by the cover, thus positions itself practically automatically in its final position. Moreover, the member of staff, when closing the cover, can perform and complete two working steps in one go, so that inserting the information medium is not only made easier, but can also be performed faster.

With this kind of procedure the invention makes use of the fact that the material of which the information medium is made has a predefined strength which as usual remains unchanged across the surface. The groove can thus be dimensioned without problems in such a way that the printed paper or carton is retained in it by a force-fit, i.e. by way of a frictional connection. It is not necessary for the vertical axis of the groove to be at right angles to the adjacent surface of the main body. Rather, the groove may be aligned according to ergonomic aspects so that a person standing in front of the push handle has the groove in his/her field of vision and can easily insert the rim of the information medium into the groove.

It is an advantage that the groove in its length, corresponds to one of the commonly used standards so that information media of standard size, i.e. papers designed according to DIN A4, fit exactly into the groove. The correspondingly standardised information medium can be fitted exactly into a groove configured in this way and is thus automatically fixed in the desired, in particular centred position above the support surface.

Preferably the groove comprises a plurality of webs which retain the inserted end edge in the groove by way of a force-fit. The groove can thus have a larger width than is necessary for a force-fit. It is narrowed in only a few places by the webs. These bottlenecks are dimensioned in such a way that a force-fit is ensured here. A wide groove provided with several bottlenecks can be manufactured in a distinctly easier manner than a narrow groove all along its length. Moreover, the fact that the frictional force now has to be overcome at only some defined points of the groove, makes insertion of the end edge of the information medium into the groove easier. It is of advantage to provide at least two spaced-apart bottlenecks in the groove. In this way inadvertent oblique or tilted insertion of the information medium is avoided.

It is advantageous if the groove is arranged in parallel with an outer edge of the region of the main body which is overlaid by the cover. In this way the information media can be inserted into the region in such a way that they run exactly along the outer edge. This improves the overall optical impression of the push handle.

If the support surface for the information medium is configured as a recess on the main body, the support surface and the cover can be adapted to each other in such a way that the transition from main body to closed cover is effected steplessly, in particular if the information medium fits exactly into the contour formed by the support surface and the closed cover, the impression of a high-quality all-in-one product is achieved.

In a preferred embodiment the closed cover on the main body covers the groove. A cover extending over the groove protects the groove against damage and prevents the information medium from being pulled out of the groove. If the cover lies close against the groove, it folds the information medium lightly over so that it forms an edge directly at the groove. Forces impacting on the information medium held in this way then act slightly transversely to the groove thereby reinforcing the hold of the information medium in its position.

In one of the specially preferred embodiments the cover retained on the main body comprises a detent lug at the end facing away from the groove, which engages in openings on the main body provided for this purpose. By means of the detent lug the cover can be quickly and securely fastened on the main body. Despite this, in principle simple, fastening method such a detent lug, provided it engages deeply into the main body, is not easy to open. The detent lug is sufficient for securing the cover against simple opening attempts and inadvertent knocks. Since the information medium present below the cover is of little value and can be replaced without problems this type of fastening for the cover is entirely adequate for the intended purpose.

Another advantage consists when the cover forms a frame for the information medium. Such a frame additionally holds the information medium in position during bending and prevents the information medium from laterally and/or upwardly breaking out of its fixing. It thereby supports the frictional fit. In particular if the base of the information medium is a somewhat stiffer carton, the forces occurring when the information medium is bent can be securely absorbed.

In a particularly preferred embodiment the cover is inserted into the main body after it has been inserted into the groove. The cover, when opened, is therefore no longer retained on the main body but is completely detached from the main body. The groove can thus be accessed very easily, inserting the information medium is not obstructed by an open cover. After fixing the information medium in the groove, the cover can simply be replaced again. For this purpose it is entirely satisfactory to provide the cover with projections at the end which are inserted into openings in the main body on both sides of the groove.

BRIEF DESCRIPTION OF THE SEVERAL VIEWS OF THE DRAWING

An embodiment of the invention will now be explained in detail with reference to the figures below, in which

FIG. 5 shows a section through a main body of the push handle with the cover removed with an enlarged view of a portion of the groove; and FIG. 6 shows the same section through the main body, but with the information medium inserted into the groove with an enlarged view of a portion of the groove.

DESCRIPTION OF THE INVENTION

Figure 1:
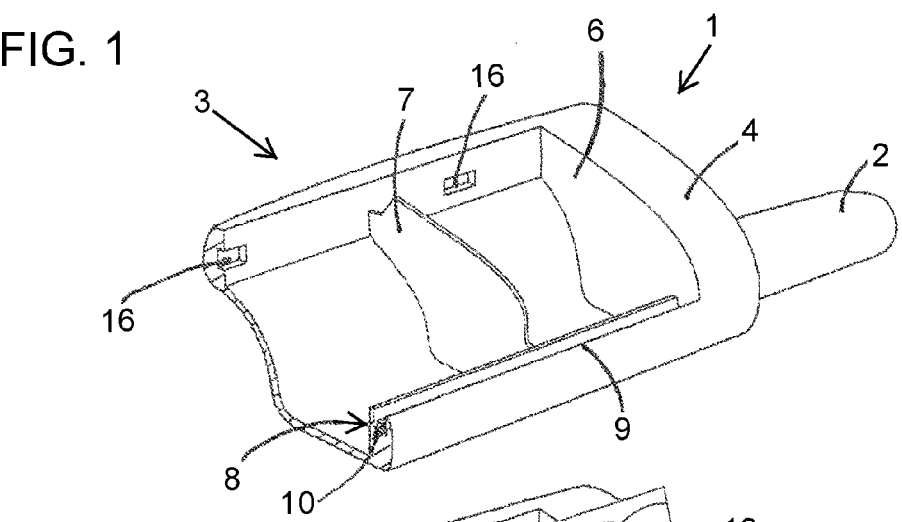
FIG. 1 shows a section through a main body of the push handle with the cover removed.

In FIG. 1 the display element 1 is shown configured in one piece, with the gripping region 2 of a push handle 3 merely indicated. The main body 4 is configured in such a way as to be inclined towards the person pushing the shopping cart and so as to be arched in this area. It comprises a region 5 which may be covered by a cover not shown here. The region 5 is shaped as a recess in the main body. A central web 7 is provided in parallel with the side edges 6 of the recess, wherein the information medium placed over the region 5 comes to rest against this central web 7.

The groove 8 which is formed into the main body 4, extends in parallel with an outer edge 9 of the region 5, which terminates the region 5 on the side of the main body facing away from the shopping cart. Between the groove 8 and the outer edge 9 a support surface 10 is provided, into which the cover can be inserted.

Figure 2:
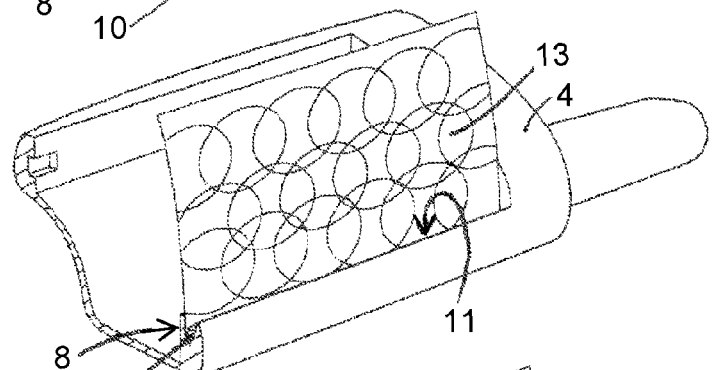
FIG. 2 shows the same section through the main body, but with the information medium inserted into the groove.

FIG. 2 shows the information medium 12 inserted with an end edge 11 into the groove 8. Webs 18 in the groove, retain the information medium 12 in a force-locking manner in the inserted position. The webs 18 in the Figures are merely a schematic representation of the webs 18 and are not limiting with respect to quantities, positioning, and/or geometrical profiles of the webs. The webs 18 narrow the gap of the groove 8 thereby forming a bottleneck in which the information medium is held clamped. In this way the information medium is positioned above the main body 4 in a free-standing manner. The position and length of the groove 8 are dimensioned such that the information medium 12 can be inserted only in such a way that it is centered over the region 5 and is positioned at least practically flush with the side edges 6 of the main body 4.

Figure 3:
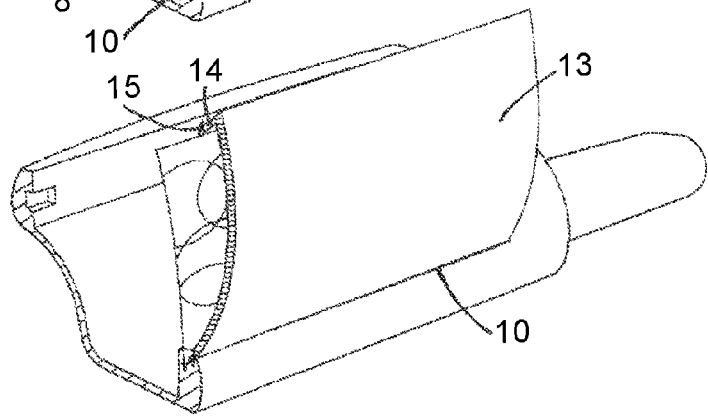
FIG. 3 shows the same section through the main body, but with the cover in the ready-to-close position.

In FIG. 3 the cover 13 is inserted into the receptacle 10 on the main body 4. The cover 13 is arched and in its shape corresponds to the shape of the main body 4 outside the region 5, i.e. laterally of the outer edge 6. At its opposite end it comprises a projection 14 facing the main body 4, which projection 14 terminates with a detent lug 15. The projection 14 forms a stop for the information medium 12 thereby preventing it, despite the given friction fit, from slipping out of the groove 8. It is entirely sufficient if the projection 14 is formed only in the area of the detent lugs 15, i.e. does not extend right the way through.

Figure 4:
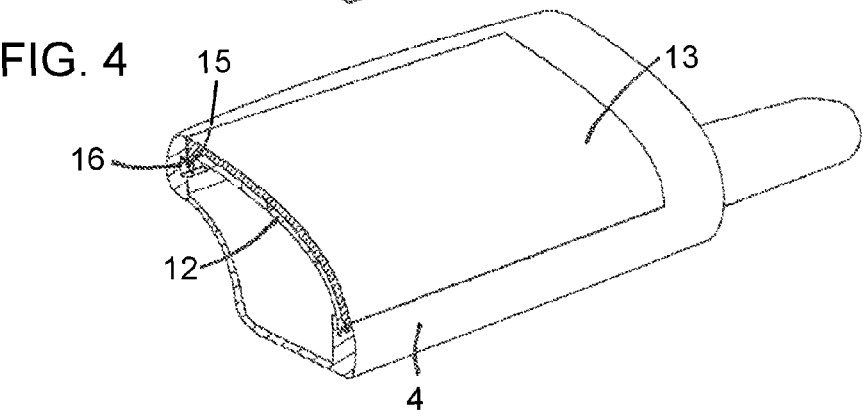
FIG. 4 shows the same section through the main body, now with the cover closed.

As shown in FIG. 4, when the cover 13 is closed, the detent lugs 15 engage into openings 16 in the main body 4 provided for this purpose, thereby retaining the cover 13 in its position on the main body 4. When the cover 13 was being closed, the information medium 12 was bent in direction of the main body 4 and then comes to rest in its end position, fixed in its arched state, against the main body 4. In this state the cover 13 completely covers the information medium 12. In addition it is positioned flush with the main body 4.

The invention claimed is:

1. A display element for presenting information on a push handle of a manually movable shopping cart, the display element comprising:
    a main body formed with an insert region;
    a transparent cover disposed to cover said insert region and removably held on said main body, wherein a flat-shaped information medium can be arranged between said main body and said transparent cover;
    said main body having a groove formed therein, for inserting therein an edge of the information medium, with the inserted said edge being retained in said groove with a force-lock, said groove being formed with a plurality of webs configured for holding the inserted said edge in the groove in a force-locking manner, said plurality of webs being bottlenecks narrowing said groove at said plurality of webs.

2. A The display element according to claim 1, wherein said groove extends parallel with an outer edge of said insert region of said main body, which is covered by said cover.

3. A The display element according to claim 1, wherein said cover held on said main body covers said groove.

4. A The display element according to claim 1, wherein said insert region to be covered by said cover is a recess formed in said main body.

5. A The display element according to claim 1, wherein said cover comprises a detent lug at an end facing away from said groove, said detent lug being configured to engage in counter openings of said main body.

6. A The display element according to claim 1, wherein said cover forms a frame for the information medium.

7. A method of inserting a two-dimensional information medium into a display element on a push handle of a manually movable shopping cart, the method comprising:
    inserting an end edge of a flat-shaped information medium into a groove in a main body of the display element, thereby causing the information medium to be held in the groove and to come to rest against a cover when the cover is closed, and to be bent in a direction of the main body.

8. A The method according to claim 7, which comprises guiding the information medium held in the groove into an intended end position on the main body by way of the cover.

9. A The method according to claim 7, which comprises inserting the cover on the main body into the groove after inserting the edge of the information medium.

10. A The method according to claim 7, which comprises inserting the information medium into a display element according to claim 1.

11. A display element for presenting information on a push handle of a manually movable shopping cart, the display element comprising:
    a main body formed with an insert region;
    a transparent cover disposed to cover said insert region and removably held on said main body;
    a flat-shaped information medium being disposed between said main body and said transparent cover;
    said main body having a groove formed therein, said groove configured for receiving an edge of the information medium therein, said groove being dimensioned for defining a frictional connection between said edge and said groove, said groove being formed with a plurality of webs defining the frictional connection, said plurality of webs being bottlenecks narrowing said groove at said plurality of webs.

* * * * *